(12) United States Patent
Moeller Larsen et al.

(10) Patent No.: US 9,370,905 B2
(45) Date of Patent: Jun. 21, 2016

(54) MODULE FOR HOLDING AT LEAST ONE BUSHING

(75) Inventors: Flemming Moeller Larsen, Christiansfeld (DK); Johannes Moser, Linz (AT); Bruno Boursier, Dublin, CA (US)

(73) Assignees: Hexcel Holding GMBH, Pasching (AT); Hexcel Corporation, Dublin, CA (US)

( * ) Notice: Subject to any disclaimer, the term of this patent is extended or adjusted under 35 U.S.C. 154(b) by 321 days.

(21) Appl. No.: 13/980,015

(22) PCT Filed: Jan. 20, 2012

(86) PCT No.: PCT/AT2012/000010
§ 371 (c)(1),
(2), (4) Date: Jul. 16, 2013

(87) PCT Pub. No.: WO2012/097394
PCT Pub. Date: Jul. 26, 2012

(65) Prior Publication Data
US 2013/0285284 A1    Oct. 31, 2013

(30) Foreign Application Priority Data
Jan. 21, 2011    (AT) .......................................... 88/2011

(51) Int. Cl.
*B29C 70/46* (2006.01)
*B29C 70/68* (2006.01)
(Continued)

(52) U.S. Cl.
CPC ................. *B29C 70/68* (2013.01); *B29C 70/46* (2013.01); *B29C 70/86* (2013.01); *F03D 1/0658* (2013.01); *B29K 2105/243* (2013.01); *Y02E 10/721* (2013.01)

(58) Field of Classification Search
CPC ........ B29C 70/46; B29C 70/86; B29C 70/68; F03D 1/0658; F03D 1/0675
See application file for complete search history.

(56) References Cited

U.S. PATENT DOCUMENTS 3,215,585 A * 11/1965 Kneipple ................ C03C 25/34
156/62.4
5,266,137 A * 11/1993 Hollingsworth ...... B29C 53/824
156/156

(Continued)

FOREIGN PATENT DOCUMENTS

EP          1134314       10/2010
WO       03/057457        7/2003
(Continued)

*Primary Examiner* — Matthew Daniels
(74) *Attorney, Agent, or Firm* — W. Mark Bielawski; David J. Oldenkamp

(57) ABSTRACT

A module (1) for holding at least one bushing (17) within a recess, wherein it comprises two side surfaces (2, 3), an upper (4) and a lower (5) surface and at least one end surface (6), wherein the upper (4) and lower (5) surfaces are of different width and arcs, respectively, in their cross-section, and the side surfaces (2, 3) are of equal height, and when coupled to a second module (8) by its side surfaces (3, 9), which second module (8) optionally may also hold at least one bushing (17), the sum of the angle (alpha) between the optionally imaginary plane side surface (12) of the one module (1) and the tangent (10) to its upper surface (4) at the intersection (A) with the side surface (3) and the angle (beta) between the optionally imaginary plane side surface (13) of the other module (8) and the tangent (11) to its upper surface (15) at the intersection (B) with the side surface (9) is at least 180 degrees and/or a plurality of modules (1), optionally when holding the bushings (17), form at least a section of a circular ring or a full circular ring.

15 Claims, 7 Drawing Sheets

(51) Int. Cl.
  *B29C 70/86* (2006.01)
  *F03D 1/06* (2006.01)
  *B29K 105/24* (2006.01)

(56) References Cited

U.S. PATENT DOCUMENTS

| | | | |
|---|---|---|---|
| 5,301,826 A | | 4/1994 | Sandahl |
| 5,489,164 A | * | 2/1996 | Tusch ................... E04B 1/6813 404/74 |
| 6,328,501 B1 | * | 12/2001 | Gimbert ................. E21D 11/08 285/293.1 |
| 2005/0106029 A1 | * | 5/2005 | Kildegaard ........... B29C 70/525 416/229 R |
| 2007/0065288 A1 | | 3/2007 | Sorensen et al. |
| 2009/0148655 A1 | | 6/2009 | Nies |
| 2009/0324420 A1 | * | 12/2009 | Arocena De La Rua ........................ B29C 70/72 416/248 |
| 2010/0158661 A1 | | 6/2010 | Dawson et al. |
| 2010/0171317 A1 | | 7/2010 | Trede |
| 2010/0260612 A1 | * | 10/2010 | Vasudeva .............. F03D 1/0675 416/227 R |
| 2012/0045343 A1 | * | 2/2012 | Hancock ................ B29C 70/30 416/226 |
| 2014/0140853 A1 | * | 5/2014 | Feigl ..................... F03D 1/0658 416/222 |

FOREIGN PATENT DOCUMENTS

| | | | | |
|---|---|---|---|---|
| WO | WO 03/082551 | | * 10/2003 | |
| WO | WO 03082551 A1 | * | 10/2003 | ............. B29C 70/24 |
| WO | 2009/008351 | | 7/2009 | |

* cited by examiner

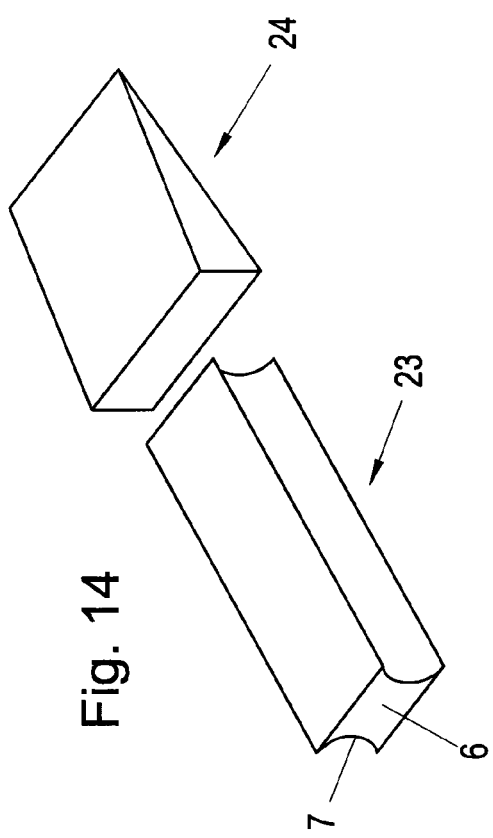
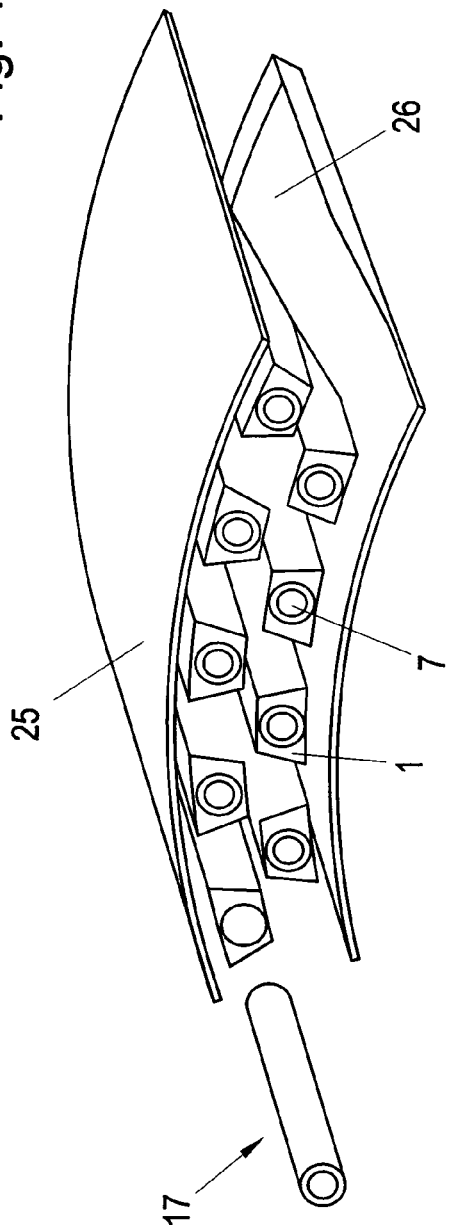

MODULE FOR HOLDING AT LEAST ONE BUSHING

The present invention regards a module for holding at least one bushing the module comprising two side surfaces, an upper and a lower surface and at least one end surface, wherein the upper and lower surfaces are of different width and arcs, respectively, in their cross-section, and the side surfaces are of equal height, and when coupled to a second module by its side surfaces, which second module optionally may also hold at least one bushing, the sum of the angle between the optionally imaginary plane side surface of the one module and the tangent to its upper surface at the intersection with the side surface and the angle between the optionally imaginary plane side surface of the other module and the tangent to its upper surface at the intersection with the side surface is at least 180 degrees and/or a plurality of modules, optionally when holding the bushings, form at least a section of a circular ring or a full circular ring, the module further comprising at least one straight lined recess extending from the one end surface in direction to the other end of the module, said recess being adapted to hold the bushing.

Today's and future large wind turbine blades require a safe and reliable "Root End" to be safely assembled to the hub of the wind turbine. The root end needs to be strong and possess high uniform manufacturing quality to ensure safe and reliable load transfer from the blade to the hub when the turbine is exposed to high wind and therefore high loads both in operation and when stopped due to high wind speeds (usually above 25 m/sec). Further, a high quality and strong light weight easy to manufacture solution will be beneficial when it comes to the large wind turbine blades being developed for the future of even larger turbines.

Today's wind turbine blades are dependent on suppliers equipped with different root concepts either well known concepts or own developed and patented concepts, which differ in design, manufacturing processes and material used for producing root sections. Some are very heavy and require large material consumption for production while others are optimised with respect to material consumption leading to reduced weight of the root section. Further some concepts are very demanding with respect to manufacturing as material amounts to be processed, number of following processing operations to manufacture root section and manual labour work are very extensive.

Depending on design and manufacturing process the quality of root sections is limited by the load transfer of the material used, further by the quality of the interfaces created by the manufacturing process and the material responsible for transfer of the load in-between different components and materials. Most of the material combinations used are steel, adhesive and/or laminates, i.e. infusion and pre-preg-material.

In general the most critical material interfaces in root sections are e.g. for bonded (adhesive) and laminated solutions, the adhesive bonding in-between the steel bushing and blade/root laminate, or the laminate interface in direct contact with the steel bushing, or for mechanical solutions the area pressure and the load transfer through the remaining blade root structure after drilling of holes for the transverse bolt (steel) and the threaded bolt (steel) for assembly to the hub.

The mechanical properties of the used materials to be bonded are the limiting factor for the bonded interface, which further depend on strength of the adhesive itself, strength of the other adjacent materials to be bonded, adhesion area and geometry to be bonded, bond line thickness, cleanliness of the surfaces to be bonded and the ability of the adhesive to adhere to materials.

The process for achieving the right quality of the interface is essential for the quality and the mechanical performance of the bonded interface. Further, the process should ensure uniform process quality throughout the manufacturing process which is required for serial manufacture of root sections. Most used concept is dealing with complex processes that due to their complexity might result in interface failures from inadequate bonding of components. To avoid this most bonded interfaces are calculated with relatively high security margins to provide for process tolerances.

In general most of these processes are performed on finished large sub-components and in some cases fully processed blades which in case of process failures results in high costs in case of need to scrap the component/blade. Alternatively, severe and expensive repair of components/blades is required due to unacceptable high costs if scrapped due to failure. Many factors have influence on bonded joints quality. Among these are quality of prepared surfaces to be bonded, injected/applied amount of adhesive, correct positioning of the bushing in the hole/adhesive to be bonded, temperature and humidity, cure cycle control when performed on large subp-components or whole blades, roughness/smoothness and cleanliness of the steel bushing to be laminated, drapability of the plies which are facing the steel bushing or inadequate vacuum to consolidate bonded components throughout the process.

Today's processes have quite extensive process steps, which in some cases are quite time consuming, labour and tool demanding. Furthermore, some of the processes are dependent from component size difficult in handling which requires well organised infrastructure as well as right handling equipment.

Furthermore, pressure cure to overcome possible consolidation problems to such components is unrealistic in this respect due to the size and the need of low cost components for wind blade manufacture.

The European patent EP 1 633 624 B1 discloses a method of manufacturing a root blade having fully bonded insert bushings with an internal thread for mounting bolts for releasable attachment to a hub of a wind turbine. The extension portion of the insert bushings may be chamfered to provide gradually reduced cross section and herewith gradually increased flexibility of the extension portion towards the tip of the blade. The bushings are preferably metallic and the portion for mounting them to the hub is preferably cylindrical. The blade root is substantially circular and made up of two parts of semicircular cross sections. A holder, e.g. made of foam material, comprising a number of recesses for accommodation of the bushings, is placed on a fibre mat in a mould. After lining the holder with at least one layer of fibre mat, the bushings are placed in the recesses and fixed to a root plate for correct positioning thereof. By hardening of the mats the bushings are bonded in the laminated blade root construction and the root plate is detached from the bushings.

The US patent application US 2009/0148655 A1 discloses a prefabricated half-product for use in manufacturing a fibre reinforced composite part of a wind turbine which comprises a number of inlays attached to a fibre mat with fixed position. The inlays are, or at least include, carrots for fastening the final fibre reinforced composite part to other parts of the wind turbine. Alternatively, the inlays can be, or at least can include, fastening means such as a bushing. The inlays are attached to the fibre mat in fixed position to each other, e.g. by gluing, during the manufacture of the fibre reinforced composite part. For finally laminating of the fibre reinforced composite part the half product is laid into a three dimensional mould.

A product usable as base material for forming a moulded product is disclosed in EP 1 134 314 B1. An intermediate composite product has a resin encapsulated fibrous sheet of constant mass and thickness that is relatively flexible and whose fibres are poorly adhered together. The sheet has superposed layers of randomly oriented fibres. The layers are attached together only where they touch each other. Forming the above product includes laying down a layer with a high percentage of fibres encapsulated in resin, making parallel cuts in the layer to form segments, randomly arranging the segments and then making the segments attach to each other where they are in contact.

From US 2010/158661 A1 prefabricated sections are known, arranged at the outer surface of a circular blade root, for improving the strength thereof, e.g. by bonding. These sections may house attachment elements, e.g. metal inserts, comprising inner threads, or the attachment elements may be cylindrical holes configured to receive bolts, rods, or pipes. The metal inserts are of cylindrical structure and are arranged within a respective section.

Aim of the present invention is to overcome the disadvantages of the state of the art mentioned above and to provide improved, optimised and enhanced load carrying critical parts in wind turbine root sections in terms of mechanical load transfer, as well as to enable simple, time- and energy-efficient manufacture of the critical parts and simple assembly of the root section.

According to the present invention this is accomplished in that the recess is a part of a circle or rectangular. The use of modules comprising bushings for wind blade root ends using glass/carbon HexMC®, unidirectional fabrics or prepregs or similar (either combined or as single products) allows the interface critical parts of the root section to be cut down into smaller components and thus to be processed under controlled process conditions. In particular by moulding the bushings under pressure of e.g. 1 to 200 bars the bushing laminate material interface consolidation is improved and mechanical properties of the interface critical components are enhanced. The moulding process can be automated to perform uniform and consistent high quality level components independent of manual labour skills. Furthermore, quality control of load transfer critical parts can be performed before assembly into root sections thus to avoid possible repair or scrap of root sections or even blades in the case a manufacturer processes the root after de-moulding the whole blade. The modules work as building blocks for the root section manufacture. Due to their shape they ease the manufacturing process and at the same time ensure that the cured and demoulded root section blades incorporate all root components necessary requiring only cut and grind after demould.

Furthermore, by breaking down the root section into smaller components (the modules) time consuming operations of load critical parts can be manufactured adjacent to the root section production (parallel production).

Breaking down root sections allows at the same time load critical parts to be manufactured in automated processes that leads to uniform and high quality produced components. Influence of lack of manual labour skills are minimised/eliminated. Moulding the steel insert allows at the same time geometrical changes to the often round axial geometry (cheap steel solution) thus to fit more optimal the root lay-up (building blocks) thus to keep it simple and by that to reduce lay-up time which again leads to increased mould throughput. The shape of the modules allows for optimisations in terms of assembling the modules together, and for various bushing geometries. The two side surfaces are not restricted to plane shape and also the amount of the radius of the upper and lower surfaces, when viewed in a cross section, is not restricted, so that even plane surfaces are within the scope of this invention. The module comprises at least one end surface for being coupled to further components of the wind turbine. The modules are intended to be coupled by their side surfaces, wherein modules comprising no, one or more than one bushings may be coupled in any sequence which is considered beneficial. By coupling modules a structure is built which represents at least a part of a root end of a wind turbine. This can be accomplished if the angles between the side surfaces of adjacent modules and their upper surfaces fulfil certain requirements. In case the side surfaces are plane or at least substantially plane, meaning that between their upper and lower end the planeness may be interrupted, the angle between this side surface and the upper surface can easily be determined by applying a tangent to the upper surface at the edge with the side surface. In this case it is required that the sum of these angles of two modules coupled together is 180 degrees. In case the side surfaces are of any shape different from plane shape the angle can be determined between an imaginary plane connecting the upper and lower end of the side surface and a tangent to the upper surface at the edge with the side surface. As will be explained further below, the sum of these angles of two modules coupled together is at least 180 degrees in this case. A plurality of modules fulfilling these requirements on the angles, housing none, one or more than one bushings, may (but are not limited to) form at least a section of a circular ring or a full circular ring, representing a root end of a wind turbine, when coupled together. Building at least a section of a circular ring or a full circular ring, representing a root end of a wind turbine may also be accomplished according to the invention by coupling modules, housing none, one or more than one bushings, that do not fulfil these requirements as to the angles. It is important that a root structure may be built by assembling modules with different shape, in particular modules fulfilling the above requirements on the angles may be mixed with modules that do not fulfil these requirements. It is further important to note, that the shape of the root structure may differ from that of a circular ring.

The module comprises at least one straight lined recess extending from the one end surface in direction to the other end of the module, said recess being adapted to hold the bushing. The recess provides for secure and stable accommodation of the bushing. It is therefore adopted to the outer surface of the bushing. The recess may be provided through the entire module, which means from the one end surface to the other end of the module. Alternatively, if ending inside the module this end provides for an inner stop for inserting the bushing which simplifies positioning of the bushing in its longitudinal direction. The invention is not limited to only one recess or bushing, respectively, per module. In particular, several bushings per module reduce the number of modules required for building the root end having a certain number of bushings, and therefore simplify the building process. The bushings may be made of metal, e.g. steel alloys, without being limited thereto. There is no need for projections or depressions on their outer surface in order to achieve sufficient adherence with the module as this is guaranteed by the curing process.

The recess is substantially circular, a part of a circle or rectangular. This shape allows for accommodation of bushings shaped correspondingly cylindrically or with rectangular profile, or to place a part of a bushing into the recess. The invention should, however, not be limited to specific shapes of recesses. Elliptical or generally polygonal cross sections are also within the scope of this invention.

According to a preferred embodiment of the present invention the angles are non-equal. This embodiment can be applied to both the case of plane or at least substantially plane side surfaces, as well as to side surfaces requiring an imaginary plane for determining the angle, as described above. An angle different from 90 degrees increases the side surfaces by which the modules are coupled and therefore improves their bonding capabilities and by this the strength of the final root end. In order to produce the circular ring, modules of different shape are arranged alternatively so that a module with wide upper surface abuts on a module with narrow upper surface. In this case at least two different shapes of modules are required for building the circular ring.

A further preferred embodiment of the present invention is characterised in that a recess is arranged on one or on each of the side surfaces of the module. In this embodiment the bushing is arranged between adjacent modules. In this case the module may be produced without having the bushing placed in it in advance whereby the bushing is exposed to less thermal stress and thus also energy costs can be reduced. The bushing is inserted afterwards during assembly of the modules. Bushings may be arranged only on one side of a module which is beneficial if the other side of this module abuts on a module without a recess on this side surface.

In a further preferred embodiment of the present invention the radius of the recess is larger than half of the height of the module. By applying such a recess a bushing can be arranged between adjacent modules such that the side surfaces of these modules do not contact each other as the diameter of the bushing is larger than the thickness (distance between upper and lower surface) of the modules. This embodiment allows for the use of bushings with larger diameter without the need to increase the thickness of the modules accordingly, thereby saving material and costs. Again, the bushings are not limited to circular cross section. As generally the side surfaces of such a module are not planar an imaginary plane connecting the upper and lower end of the side surface is used to determine the angle between the side surface and a tangent to the upper surface at the edge with the side surface.

In a further preferred embodiment of the present invention a recess is arranged between the side surfaces and the upper and lower surfaces of the module. Accordingly, the bushing is completely accommodated within the module, providing for especially strong anchoring of the bushing. A subsequent process step for inserting the bushing after curing the module can therefore be omitted. More than one recess/bushing may be provided within a module.

A further preferred embodiment of the present invention is characterised in that the module comprises at least two parts. It is preferred that partitioning is performed such that the insertion and correct positioning of the bushings in the module is simplified. The single parts are assembled by the curing process. It is especially preferred that the module comprises 2, 3 or 4 components.

In a further preferred embodiment of the present invention the module is divided horizontally in longitudinal direction into an upper part and a lower part, and the recesses are located on the corresponding contact surfaces of the upper and the lower part. The separation plane between upper and lower part extends through the recesses. This allows for simplified placing of bushings into the one or more recesses in the lower part of the module, prior to placing its upper part. Again, unnecessary heating of the bushings can be avoided by first curing the parts of the module and afterwards placing the bushings.

In a further preferred embodiment of the present invention the width of the upper surface of the lower part differs from the width of the lower surface of the upper part of the module. Due to these different widths the side surfaces, which are the contact surfaces of adjacent modules, are increased. Any zig-zag shape, in particular a sawtooth shape of the side surfaces of the assembled module can be applied. This leads to both improved adherence between adjacent modules and improved strength of the final root end. The width of the upper surface of the lower part may either be larger or smaller than the width of the lower surface of the upper part. The angles between the side surfaces of upper or lower parts, respectively, and the tangent on the upper surface may in this embodiment differ from the respective angles in the case the widths were equal. Therefore, an imaginary plane connecting the upper and lower end of the side surface of the assembled module is used to determine the angle between the side surface and a tangent to the upper surface at the edge with the side surface.

In a further preferred embodiment of the present invention the module is divided parallel to the one end surface into a front part and a back part. This embodiment allows for placing the back part first in order to provide a stop portion for the front part in longitudinal direction of the module and thereby simplified arrangement of the front part. The embodiment is neither restricted to a recess in the back part nor to a back part chamfered in the direction to its end opposite the front part. In a particular preferred embodiment the module comprises 3 parts, i.e. one back part and an upper and a lower front part. After placing the back part which provides for a stop portion of the lower front part the bushings may be inserted into the recess of the lower front part and finally the upper front part may be positioned.

A further preferred embodiment of the present invention is characterised in that the module contains a mixture of fibres oriented randomly in different directions and a thermosetting resin material. These fibres and the resin can be provided e.g. by the product HexMC®, exclusively provided by Hexcel Corporation, which is a sheet-moulding compound specifically designed for compression moulding of complex shapes. The epoxy matrix and high fibre volume content of this product are in particular suitable for moulding the bushings. By placing the bushings between several layers of this sheet material time consuming cutting of prepreg or dry fibre plies into numerous small pieces can be avoided. The structure is then applied to pressure moulding with up to e.g. 200 bars and provides therefore for a high quality steel laminate interface, while in the prior art the pressure is essentially limited to 1 bar. An exemplary temperature range for the moulding process is about between 30 and 250° C. However, it shall be noted that randomly oriented fibres may be mixed with any other suitable fibres like unidirectional or multi-axial fibres as well.

A further preferred embodiment of the present invention is characterised in that the resin material is at least partially cured. The bushings may be placed within or between the modules without the need of fully cured modules. Due to pre-curing the material contained in the modules the exothermic reaction during cure of the root section, containing the modules can be reduced. There is less reactive material in the mould compared to the prior art, resulting in reduced cure time and higher mould throughput.

A further preferred embodiment of the present invention is characterised in that the modules are used for building a root end for mounting wind blades to the hub of a wind turbine. In an exemplary manufacturing process a root outer laminate skin is positioned onto a mould surface onto which the moulded modules and steel bushings are accurately positioned and fixed in the root mould. On top of the modules a root inner laminate skin is positioned. This arrangement is cured in vacuum to consolidate the material interfaces. Finally, the demoulded, cut and grinded root section is ready for being used in a wind turbine. The number of modules being assembled may vary within a large range e.g. from 50 to 300. Suitable materials for root outer laminate skin and root inner laminate skin are dry fibres or prepreg materials. The resin used for assembling the modules as well as outer and inner laminate skin may comprise epoxy, phenolic, vinyl ester, polyester or any other resin suitable for producing wind blades.

Due to this kind of building block system the root lay-up time is significantly reduced to below e.g. 50% compared to the root manufacture process in the prior art. Furthermore, the manual labour for root lay-up is reduced which results in higher mould throughput. It is an important improvement over the prior art that the manufacture of the modules can be performed by a process which allows for high precision and therefore narrow tolerances of moulded geometries. This results in improved interfaces among bushings and modules as well as between modules and in equal produced quality of final root sections.

In the following, the invention will be explained in more detail by way of a preferred example embodiments illustrated in the drawings to which it is, however, not limited. In detail:

FIG. 14 shows a module separated in front and back part;

FIG. 15 shows an explosion view of section of a root structure;

Figure 1:
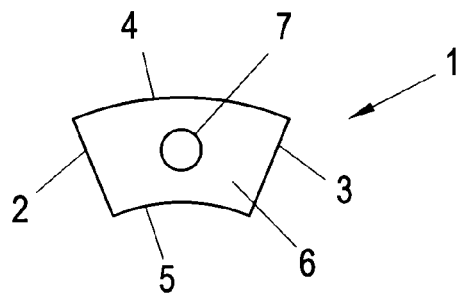
FIG. 1 is a schematic cross sectional view of a module.
Figure 2:
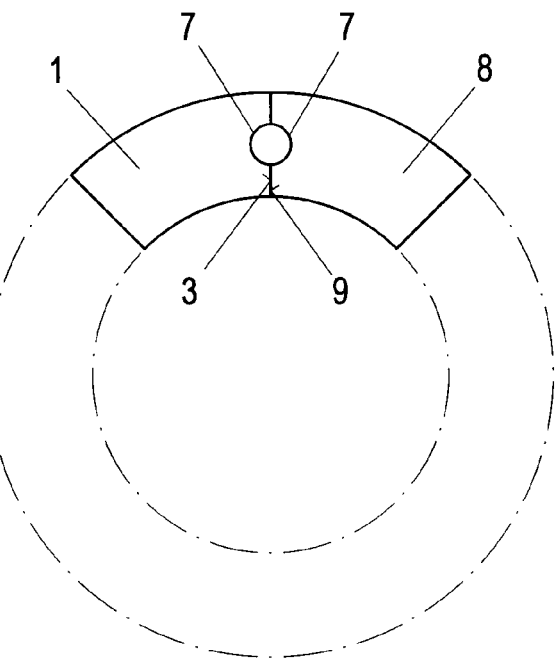
FIG. 2 is a schematic view of two adjacent modules.
Figure 3:
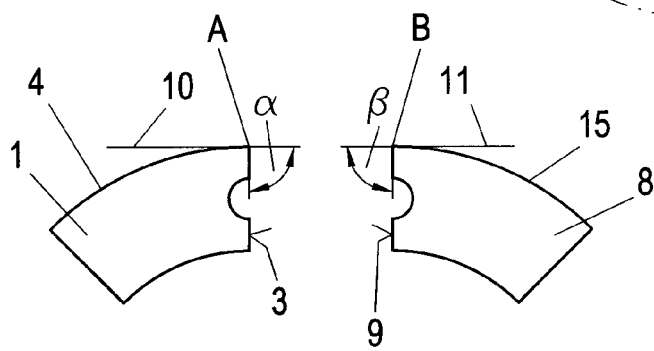
FIG. 3 is a schematic view of two separated modules able to be assembled with partly plane side surfaces.

FIG. 1 shows an embodiment of a module 1 having two side surfaces 2 and 3, an upper surface 4 and a lower surface 5 and an end surface 6. The side surfaces 2 and 3 are of equal height and the upper and lower surfaces 4 and 5 are of different widths and may be arcs without being limited to this. The module 1 comprises a recess 7. The module 1 may be coupled to an adjacent module 8 by side surfaces 3 and 9 shown in FIG. 2. The side surfaces of the modules may be planar, largely planar or completely uneven. An embodiment of largely planar side surfaces of modules is shown in particular in FIG. 3. Both, the side surface 3 of module 1 and the side surface 9 of module 8 contain recesses which, however, as they do not extend over the complete side surface, allow for determination of an angle α or β, respectively, to the tangents 10 or 11, respectively, on their upper surfaces 4, 15. The tangents 10 or 11, respectively, are placed at the intersections A or B, respectively, of the upper surfaces with the respective side surfaces 3, 9 of the modules. As can be clearly seen, the sum of the angles α and β is 180°.

Figure 4:
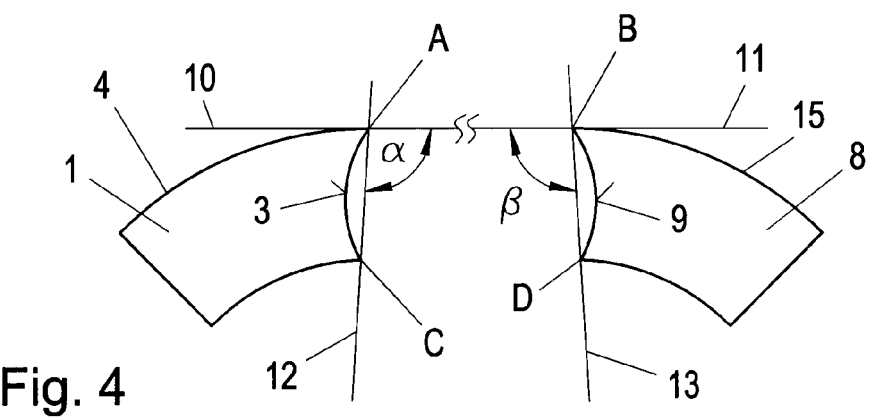
FIG. 4 is a schematic view of two separated modules able to be assembled with fully non-planar side surfaces.

Recesses extending beyond the side surfaces of a module cause side surfaces which are not completely planar, as shown in FIG. 4. In order to determine the angle between the side surfaces and the tangents on the upper surfaces of the modules an imaginary plane 12, 13 can be drawn on the side surfaces 3, 9, in particular between the points A and C and between the points B and D, as shown in FIG. 4. As a consequence of the geometrical relationships, in particular due to the different diameters of lower 5 and upper surfaces 4 of the modules 1, 8 and the fully non-planar side surfaces 3, 9, the angle α and β between the imaginary plane 12, 13 and the respective tangent on the upper surface 4, 15 of each module 1, 8 increases beyond 90°. Therefore, the sum of the angles α and β of two modules connectable by a bushing with larger diameter than the height of the modules may be more than 180°.

Figure 5:
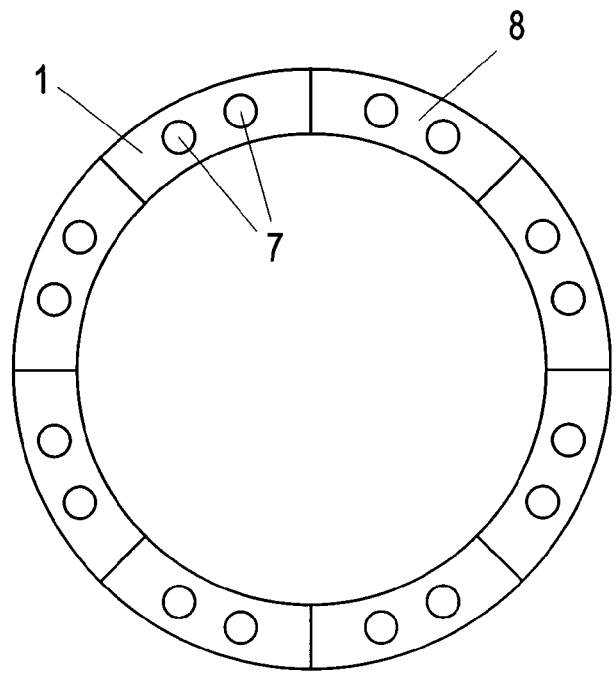
FIG. 5 is a schematic view of modules assembled to form a fully circular ring structure.

For building at least a section of a circular ring structure or a full circular ring structure, as shown in FIG. 5, the modules are coupled by their side surfaces. Although FIG. 5 shows an assembly of modules having two recesses 7 each the invention is not limited to an assembly of modules having the same number of bushings. In particular, a module may be coupled to an adjacent module having no or any other suitable number of bushings.

Figure 6:
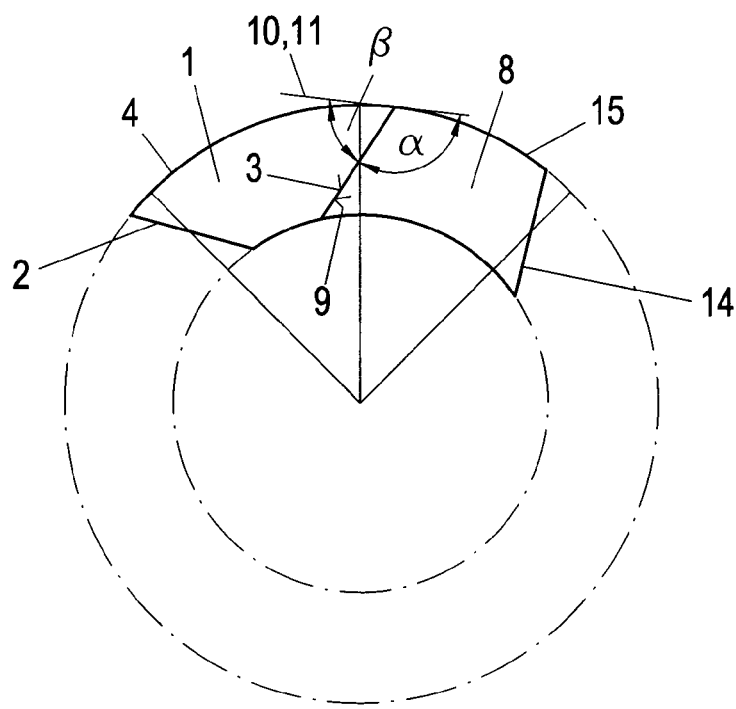
FIG. 6 is a schematic view of two adjacent modules having different angles between their upper surfaces and their adjacent side surfaces.

According to a preferred embodiment of the present invention the angles α and β may be non-equal as shown in FIG. 6, allowing for side surfaces with increased size, as can be seen. Both the sides surfaces 2 and 3 of module 1 and the side surfaces 9 and 14 of module 8 are inclined differently with respect to the representation in FIG. 3. Still, the angle α is determined between the tangent 10 on the upper surface 4 of module 1 and its side surface 3 and the angle β is determined between the tangent 11 on the upper surface 15 of module 8 and its side surface 9. The modules 1 and 8 are of different shape in order to form a ring structure by coupling the side surfaces 3, 9 of the modules 1, 8.

Figure 7:
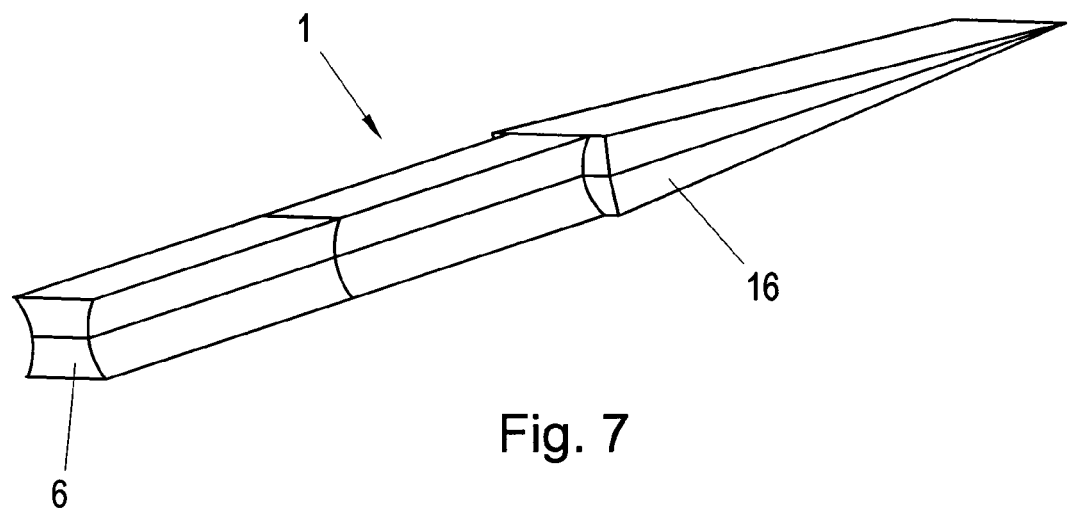
FIG. 7 shows a module with recesses and a stop portion.

The at least one straight lined recess in a module 1 extends from its one end surface 6 in direction to the other end of the module 1. For simplified positioning of the bushing 17 in longitudinal direction of the module 1 a stop portion 16 may be foreseen, as shown in FIG. 7. Although the illustrated module 1 shows a chamfered end section the invention is not limited to modules of this shape. In a not shown embodiment the recess may also pass through the entire length of the module.

Figure 8:
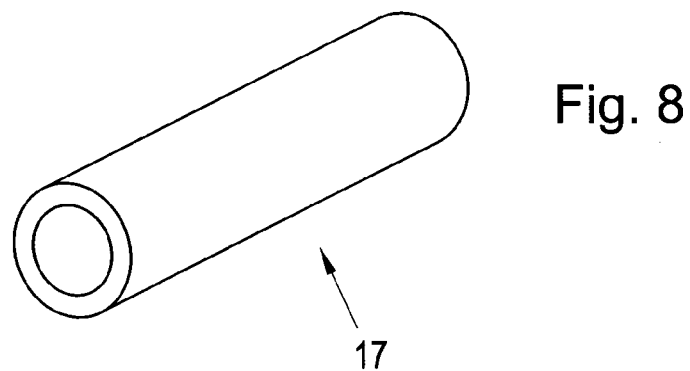
FIG. 8 shows a bushing.
Figure 9:
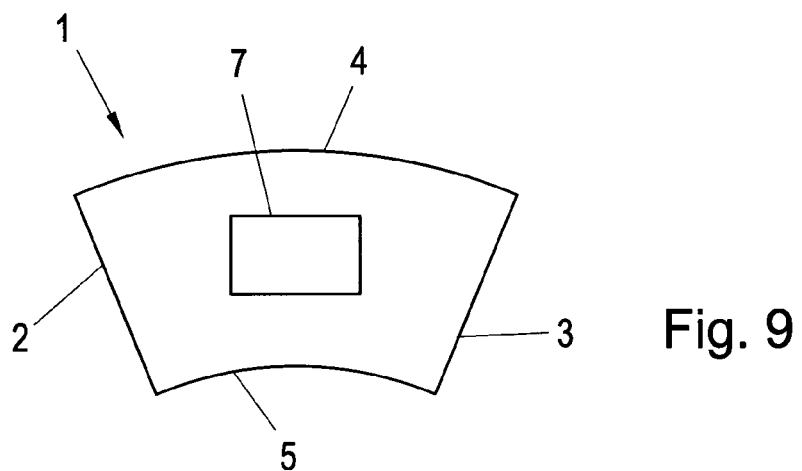
FIG. 9 is a schematic view of a module having a different shaped recess.

An example of a bushing 17 to be inserted in a recess 7 of the module 1 is shown in FIG. 8. In this representation the bushing 17 has an essentially cylindrical outer surface. Accordingly, a recess suitable for housing such a bushing has a circular cross section or in the case the diameter of the bushing 17 is larger than the height of the module 1 a part of a circle in the cross section. The invention is, however, not limited to these shapes of recesses so that also bushings with rectangular cross section and accordingly formed recesses in the modules are within the scope of this invention. FIG. 9 shows a module 1 with a rectangular recess 7.

Figure 10:
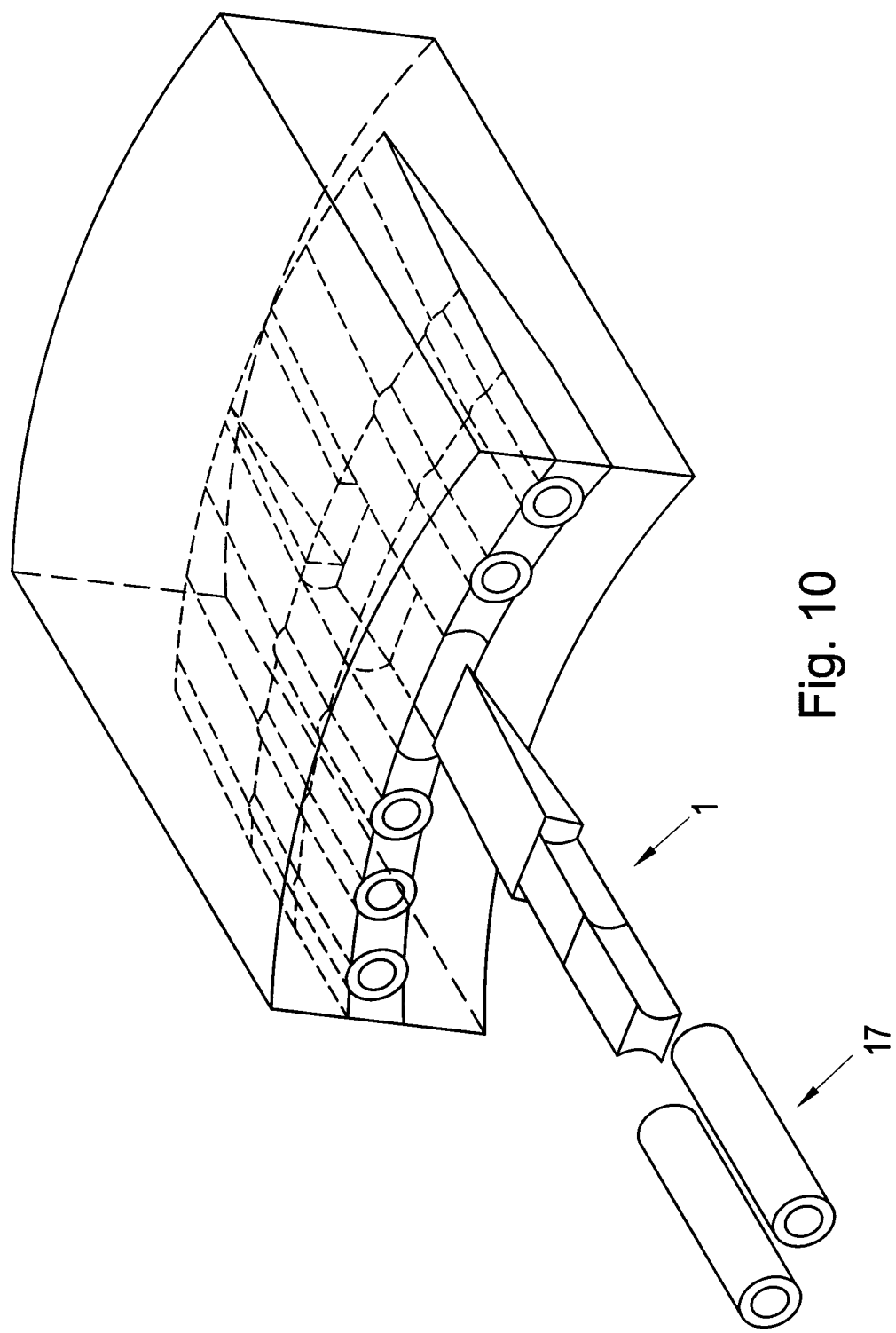
FIG. 10 shows an assembly of modules and bushings.

An assembly of modules 1 with recesses 7 on both side surfaces 2, 3 for accommodating bushings 17 between the modules is shown in FIG. 10. The diameter of the bushing 17 in this representation is larger than the distance between upper surface 4 and lower surface 5 of module 1.

According to another embodiment of the present invention one or more recesses 7 may be arranged between the side surfaces 2 and 3 and the upper and lower surfaces 4 and 5 of a module 1 as in particular shown in FIGS. 1 and 9.

Figure 11:
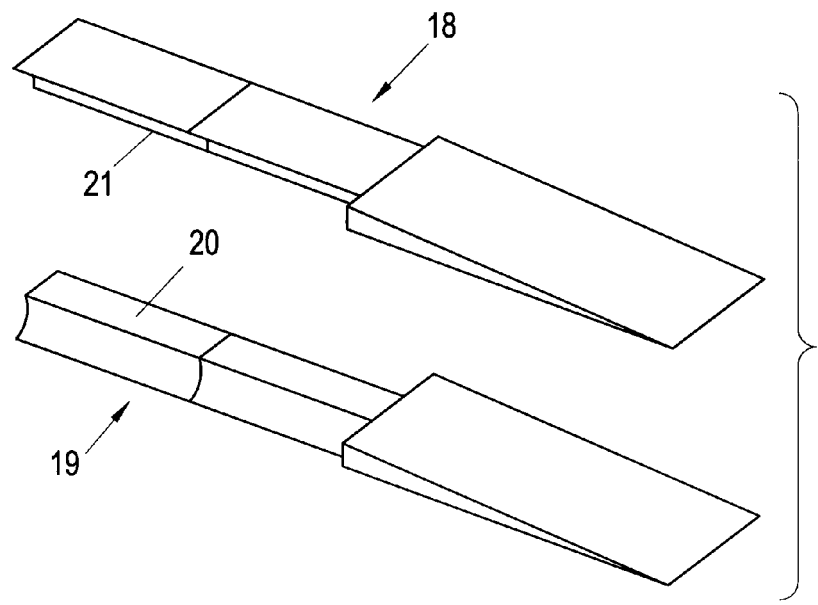
FIG. 11 shows upper and lower parts of a module.

In contrast to producing a module 1 in one piece, the module may comprise according to a preferred embodiment of the invention at least two parts. In particular, the module may be divided horizontally in longitudinal direction into an upper part 18 and a lower part 19 as shown in FIG. 11. It is beneficial that this split into upper and lower parts 18 and 19 allows for simplified insertion of a bushing 17. After placing a bushing 17 in the recess of the lower part 19 the upper part 18 may be placed with its lower surface 21 on the upper surface 20 of the lower part 19 in order to assemble the module.

Figure 12:
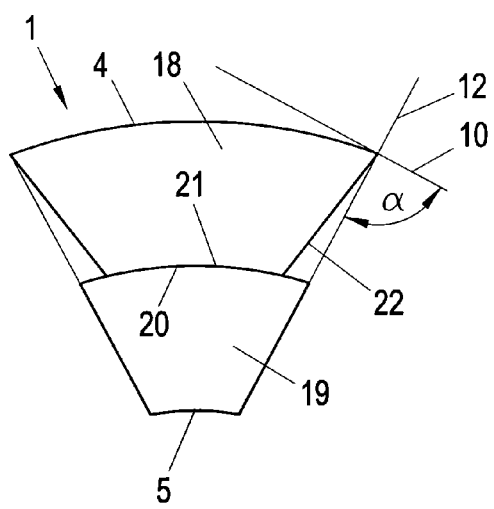
FIG. 12 shows a module with different widths of upper and lower surfaces of lower and upper parts.
Figure 13:
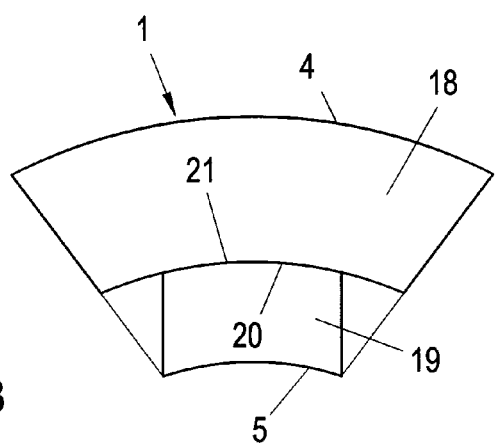
FIG. 13 shows another embodiment of a module with different widths of upper and lower surfaces of lower and upper parts.

In order to enhance the bonding capabilities between adjacent modules 1, 8 while keeping the benefit of separate upper 18 and lower 19 parts of the module the width of the upper surface 20 of the lower part 19 differs from the width of the lower surface 21 of the upper part 18 of the module 1. These particular embodiments are shown in FIGS. 12 and 13. As can be seen in the example of FIG. 12 the angle between side surface 22 of the upper part 18 of module 1 and the tangent 10 in this case differs from the angle when the surfaces 20 and 21 are of equal width. As the side surfaces of module 1 in FIGS. 12 and 13 are not planar any more, the angle α can be determined between the tangent 10 of module 1 and an imaginary side plane 12.

In order to further simplify the positioning of the modules or bushings, respectively, the module may be divided parallel to its end surface 6 into a front part 23 and a back part 24. As illustrated in FIG. 14 the back part 24 serves as a stop portion for both the front part 23 and the bushing 17. According to an embodiment of this invention the front part 23 may still be divided into an upper part 18 and a lower part 19. Furthermore, also the back part may be divided in an upper and a lower part (not shown). The module 1 will therefore be divided into two or more, even into more than four parts.

Figure 16:
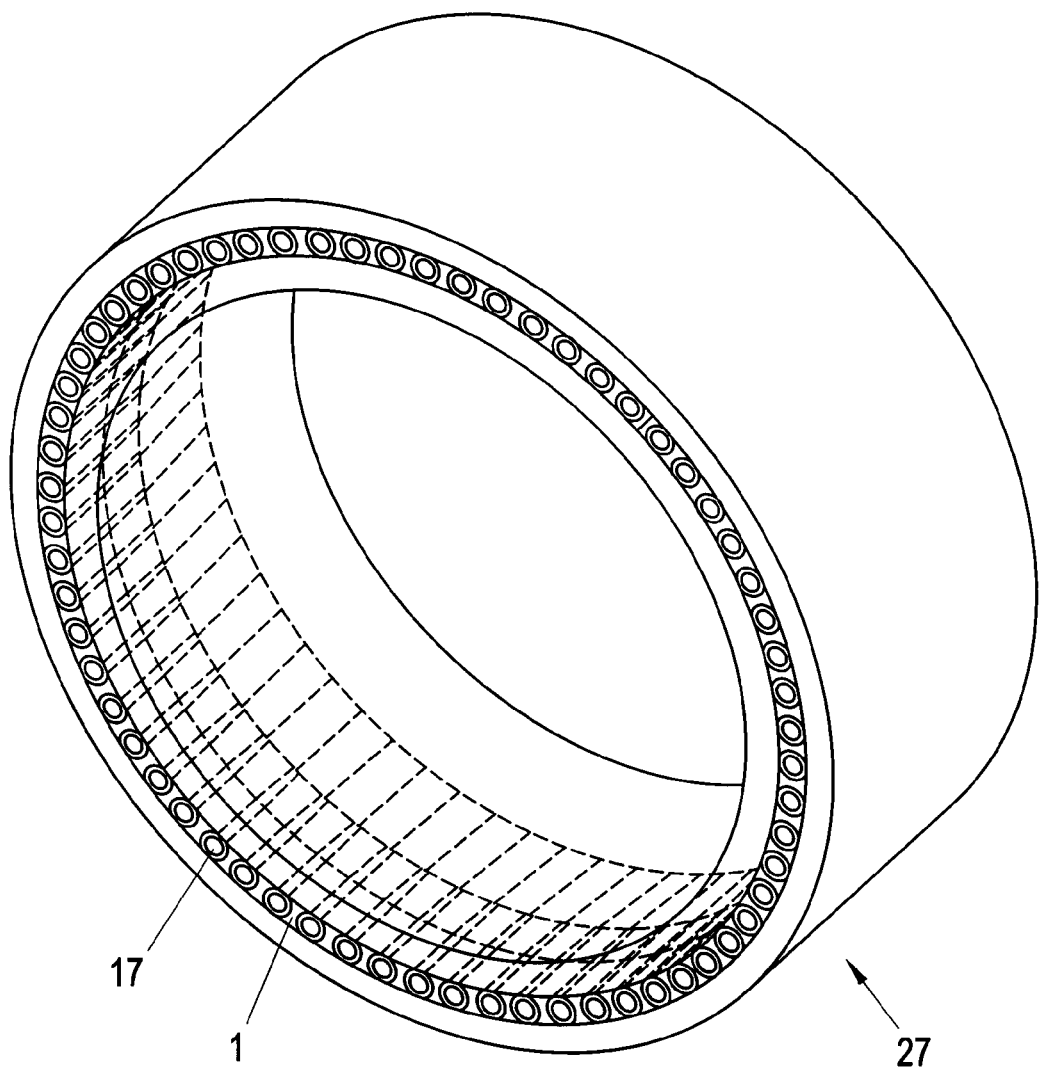
FIG. 16 shows a complete root section.

For building a root section, the modules 1 including one or more bushings 17 are placed between a root outer laminate skin 25 and a root inner laminate skin 26, as shown in FIG. 15 prior to being cured in vacuum. The final route section 27 as shown in FIG. 16 comprises a number of modules 1, which may contain one or more bushings 17 each and/or have a bushing 17 each arranged between adjacent modules 1.

The invention claimed is:

1. A wind turbine blade having a root end formed by a circular outer laminate skin and a concentric circular inner laminate skin, wherein modules for mounting the wind turbine blade to a wind turbine hub are molded into an annular space between the outer laminate skin and inner laminate skin, said wind turbine blade comprising:
    a circular outer laminate skin having an inside surface and comprising fibers and a cured resin;
    a circular inner laminate skin having an outside surface and comprising fibers and cured resin, said inner laminate being located concentrically with respect to said outer skin laminate skin so that said inside surface and said outside surface define an annular space at said root end, said annular space having an outside defined by the inside surface of said outer laminate, an inside defined by the outside surface of said inner laminate, a front located at said root end and a rear;
    a first tubular bushing having a front end, a rear end and an outside bushing surface which extends between the front end and the rear end of said first tubular bushing, said first tubular bushing being located in said annular space so that the front end of said first tubular bushing is located at the front of said annular space and the rear end of said first tubular bushing is located towards the rear of said annular space, said outside bushing surface of said first tubular bushing having a first side portion located in said annular space and a second side portion located in said annular space on the opposite side of the outside bushing surface of said first tubular bushing;
    a first module comprising fibers and a cured resin, said first module having a front end, a rear end, and a stop portion between the front end and rear end, said first module being located in said annular space so that the front end of said first module is located at the front of said annular space and the rear end of said first module is located towards the rear of said annular space, said first module having a first side extending between the front end and rear end of said first module, a second side extending between the front end and rear end of said first module, a top side extending between the front end and rear end of said first module and a bottom side extending between the front end and rear end of said first module, wherein the top side of said first module is molded to the inside surface of said outer laminate skin and the bottom side of said first module is molded to the outside surface of said inner laminate skin and wherein the first side surface of said first module is molded to the second side portion of the outside bushing surface of said first tubular bushing; and
    a second module comprising fibers and a cured resin, said second module having a front end, a rear end, and stop portion between the front end and rear end, said second module being located in said annular space so that the front end of said second module is located at the front of said annular space and the rear end of said second module is located towards the rear of said annular space, said second module having a first side extending between the front end and the rear end of said second module, a second side extending between the front end and rear end of said second module, a top side extending between the front end and rear end of said second module and a bottom side extending between the front end and rear end of said second module, wherein the top side of said second module is molded to the inside surface of said outer laminate skin and the bottom side of said second module is molded to the outside surface of said inner laminate skin and wherein the second side surface of said second module is molded to the first side portion of the outside bushing surface of said first tubular bushing.

2. The wind turbine blade according to claim 1 which comprises a second tubular bushing having a front end, a rear end and an outside bushing surface which extends between the front end and the rear end of said second tubular bushing, said second tubular bushing being located in said annular space so that the front end of said second tubular bushing is located at the front of said annular space and the rear end of said second tubular bushing is located towards the rear of said annular space, said outside bushing surface of said second tubular bushing having a first side portion located in said annular space and a second side portion located in said annular space on the opposite side of the outside bushing surface of said second tubular bushing, wherein the second side surface of said first module is molded to the first side portion of the outside bushing surface of said second tubular bushing.

3. The wind turbine blade according to claim 2 which comprises a third tubular bushing having a front end, a rear end and an outside bushing surface which extends between the front end and the rear end of said third tubular bushing, said third tubular bushing being located in said annular space so that the front end of said third tubular bushing is located at the front of said annular space and the rear end of said third tubular bushing is located towards the rear of said annular space, said outside bushing surface of said third tubular bushing having a first side portion located in said annular space and a second side portion located in said annular space on the opposite side of the outside bushing surface of said third tubular bushing, wherein the first side surface of said second module is molded to the second side portion of the outside bushing surface of said third tubular bushing.

4. The wind turbine blade according to claim 3 wherein the second side portion of the outside bushing surface of said third tubular bushing has a convex shape and the first side surface of said second module that is molded thereto has a concave shape.

5. The wind turbine blade according to claim 4 wherein the second side portion of the outside bushing surface of said first tubular bushing has a convex shape and the first side surface of said first module that is molded thereto has a concave shape and wherein the first side portion of the outside bushing surface of said first tubular bushing has a convex shape and the second side surface of said second module that is molded thereto has a concave shape.

6. The wind turbine blade according to claim 5 wherein the first side portion of the outside bushing surface of said second tubular bushing has a convex shape and the second side surface of said first module that is molded thereto has a concave shape.

7. The wind turbine blade according to claim 2 wherein the first side portion of the outside bushing surface of said second tubular bushing has a convex shape and the second side surface of said first module that is molded thereto has a concave shape.

8. The wind turbine blade according to claim 7 wherein the second side portion of the outside bushing surface of said first tubular bushing has a convex shape and the first side surface of said first module that is molded thereto has a concave shape and wherein the first side portion of the outside bushing surface of said first tubular bushing has a convex shape and the second side surface of said second module that is molded thereto has a concave shape.

9. The wind turbine blade according to claim 1 wherein the second side portion of the outside bushing surface of said first tubular bushing has a convex shape and the first side surface of said first module that is molded thereto has a concave shape and wherein the first side portion of the outside bushing surface of said first tubular bushing has a convex shape and the second side surface of said second module that is molded thereto has a concave shape.

10. The wind turbine blade according to claim 1 wherein said first module comprises sheet-molding compound which has been molded to form a first module comprising fibers oriented randomly in different directions and a thermosetting resin material.

11. The wind turbine blade according to claim 10 wherein said second module comprises sheet-molding compound which has been molded to form a second module comprising fibers oriented randomly in different directions and a thermosetting resin material.

12. The wind turbine blade according to claim 1 wherein the entire outside bushing surface of said first tubular bushing is surrounded by the first side surface of said first module and the second side surface of said second module.

13. The wind turbine blade according to claim 12 wherein said first module and said second module each comprises sheet-molding compound which has been molded to form first and second modules which each comprise fibers oriented randomly in different directions and a thermosetting resin material.

14. The wind turbine blade according to claim 1 wherein the outside bushing surface of said first tubular bushing comprises a top portion and a bottom portion, wherein said top portion is molded to the inside surface of said outer laminate skin and wherein said bottom portion is molded to the outside surface of said inner laminate skin.

15. The wind turbine blade according to claim 14 wherein said first module and said second module each comprises sheet-molding compound which has been molded to form first and second modules which each comprise fibers oriented randomly in different directions and a thermosetting resin material.

* * * * *